Figure 1:
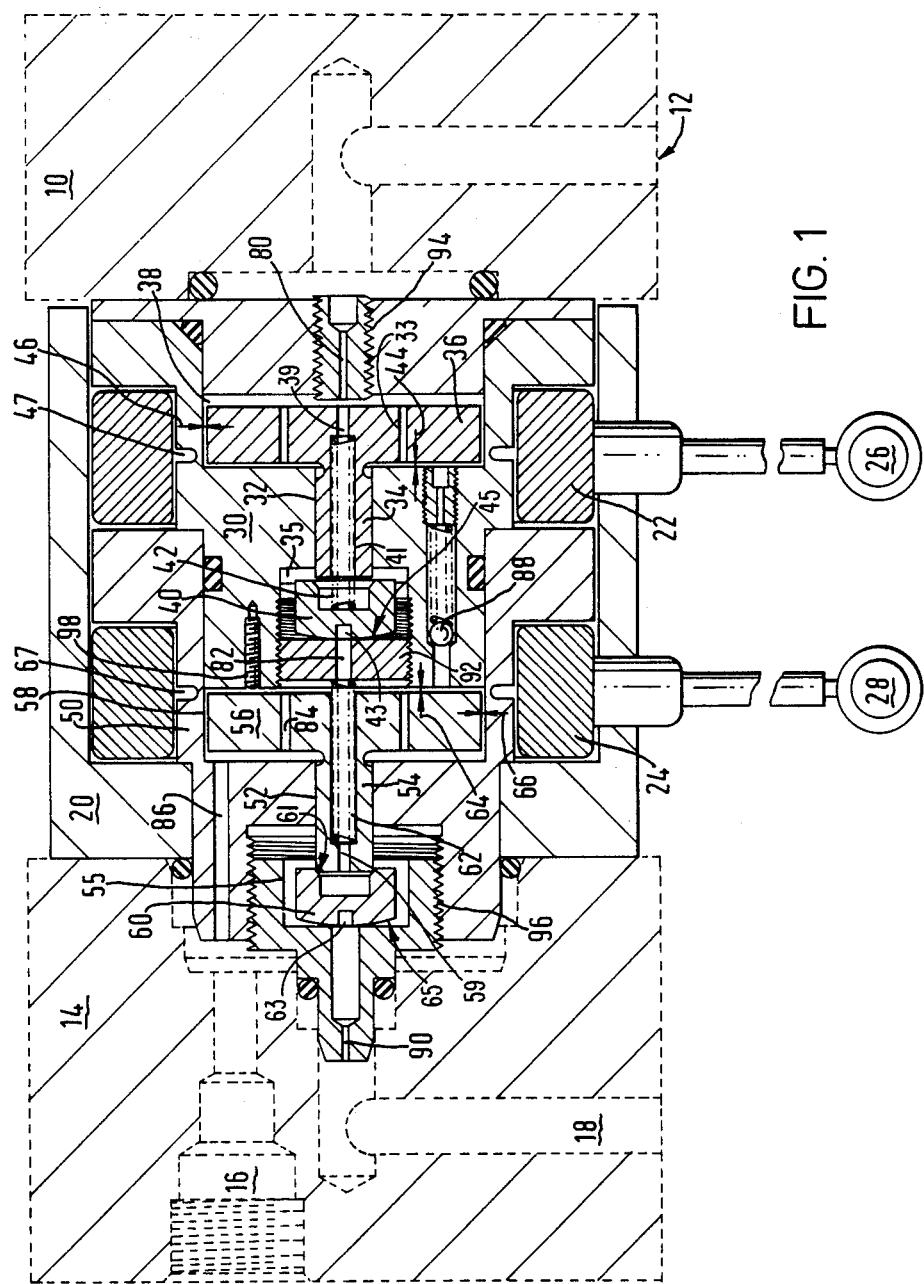

United States Patent [19]

Hawker et al.

[11] Patent Number: 4,486,053
[45] Date of Patent: Dec. 4, 1984

[54] SOLENOID OPERATED VALVES

[75] Inventors: Michael J. Hawker; Joseph Mair, both of Lincoln, England

[73] Assignee: Clayton Dewandre Company Limited, Lincoln, England

[21] Appl. No.: 315,876

[22] Filed: Oct. 28, 1981

[30] Foreign Application Priority Data

Nov. 4, 1980 [GB] United Kingdom ............... 8035323

[51] Int. Cl.³ .................. B60T 13/68; B60T 8/08
[52] U.S. Cl. .................... 303/119; 251/141
[58] Field of Search ............ 188/181 A; 251/137, 251/138, 139, 141; 303/113, 115, 117, 119

[56] References Cited

U.S. PATENT DOCUMENTS

| | | | |
|---|---|---|---|
| 2,853,659 | 9/1958 | Herion | 251/141 X |
| 3,066,988 | 12/1962 | McCrae | 303/119 |
| 3,231,233 | 1/1966 | Herion | 251/141 X |
| 3,480,335 | 11/1969 | Inada | 303/115 |
| 3,671,085 | 6/1972 | Pasek et al. | 303/115 |
| 4,067,541 | 1/1978 | Hunter | 251/141 X |

Primary Examiner—Duane A. Reger
Attorney, Agent, or Firm—LeBlanc, Nolan, Shur & Nies

[57] ABSTRACT

An hydraulic control valve and particularly such a valve for use as an automotive brake pressure modulation valve to maintain optimum adhesion and traction between the tire of the vehicle and the road surface during braking when the wheel shows a tendency to lock. The valve comprises one or more solenoid operated valves in which the solenoid core defines a chamber for a fluid under pressure. Preferably the valve member is in the form of a spool connected to or constituting the armature and is slidable within the core. The core has a narrow waisted portion provided to establish a preferred flux part through the armature. This arrangement enables the core of the valve to withstand the necessary operating pressure without the need for complex and carefully controlled welding. Smaller solenoids can be used by pressure balancing the valves.

8 Claims, 3 Drawing Figures

SOLENOID OPERATED VALVES

This invention relates to an hydraulic control valve and more particularly to such a valve for use as an automotive brake pressure modulation valve to maintain optimum adhesion or traction between the tire of the vehicle and the road surface during braking when the wheel shows a tendency to lock. Braking systems incorporating such control are commonly referred to as "anti-lock systems".

Solenoid operated valves are known in which a desired combination of inlet valve and exhaust valve settings can be obtained depending upon the level of the solenoid operating current which is generated in response to conditions at the wheel detected by sensors which can be in the form of electromagnetic transducers.

In one particular valve, the inlet and exhaust valves comprise movable balls co-operating with seats and biased apart by a light compression spring such that the inlet valve is normally open and the exhaust valve is normally closed. Both valves are movable from their normal positions by the armature of a solenoid supplied with an operating current having one of three levels depending on the road conditions. In the normal position the current has a low level (generally zero) and at its highest level the force generated in the solenoid is sufficient to overcome the combined effect of the light spring and a more powerful compression spring (tending to retain both valves in the normal position) so closing the inlet valve and opening the exhaust valve. The intermediate current level on the other hand, while sufficient to overcome the light compression spring is insufficient to overcome the combined effect of the two springs, so that the inlet valve closes without opening the exhaust valve. In addition to the spring forces, the solenoid is required to overcome the force of the inlet pressure acting over the area of the ball valves. Although, in general, the valves are small, the system pressure is considerable (typically 2000 psi) so that a sizable solenoid is necessary.

Such valves are bulky and require a large solenoid coil with consequently high heat losses and electrical power consumption, if acceptable levels of fluid flow are achieved.

Another problem is that the solenoid core within which the armature is movable must include a break in the magnetic circuit so establishing a preferential flux path through the armature. However, the core also serves as a housing for the pressure fluid and to accommodate this it is possible to construct the core by welding together axial sections one of which is of a non-magnetic material, all of the sections being designed to withstand the necessary pressure. This is a complicated and hence an expensive procedure.

In accordance with one aspect of the present invention we propose an hydraulic control valve comprising a solenoid operated valve having a solenoid core defining a chamber for fluid under pressure, and a valve member constituting or connected for movement with the armature of the solenoid which is slidable within the core, wherein a narrow waisted portion is provided in the core so as to establish a preferential flux path through the armature. This avoids the need to provide a break in the flux path through the core by means of a composite structure including non-magnetic elements as in conventional valves. Indeed the core of a valve according to the present invention is preferably formed in one piece and can be made to withstand the necessary operating pressures without the need for complex and carefully controlled welding operations.

We also propose in accordance with the present invention a hydraulic control valve comprising a pressure balanced solenoid operated valve whereby the magnetic forces needed to operate the valve and hence also the solenoid means per se may be very much smaller than those needed to operate conventional control valves.

In an hydraulic control valve for use as an automotive brake pressure modulation valve there are two solenoid operated valves: an inlet valve and an exhaust valve and, in accordance with this invention, each of the said valves is independently pressure balanced and operable by independent solenoid means.

The or each solenoid operated valve is preferably a spool valve, the valve spool being integral with the associated solenoid armature. Such an arrangement enables accurate containing of the armature and minimises frictional resistance. Also, the spool serves to isolate pressure in one chamber from the pressure in another. The valve spool may have a flanged end forming the armature and disposed with an enlarged bore in the core, communicating with an inlet for fluid under pressure. The other end of the spool co-operates with a cup-like valve seat element, the interior of which communicates with the said enlarged bore via a bore through the spool.

The invention also includes an hydraulic anti-lock braking system having a control valve according to this invention for controlling the supply of fluid under pressure from the brake valve delivery to the brake actuator at the wheel of the vehicle, the coil of the solenoid-operated valve or valves being connected to a control unit operable to generate actuating signals in response to data signals produced by sensing means and representative of conditions at the vehicle wheel.

Embodiments of the invention will now be described by way of example with reference to FIGS. 1 and 2 of the accompanying drawings each of which is a schematic cross-sectional view of a solenoid operated control valve for use in an anti-lock system, and with reference to FIG. 3 which is a part-sectional view of the valve shown in FIG. 2. In each case, the control valve is designed for use as an automotive brake pressure modulation device to maintain optimum adhesion between the tire and road surface during anti-lock braking and is fitted into the line between the brake valve delivery and the wheel brake actuator.

With reference to FIG. 1, the valve body is built-up of three blocks of which one end block 10 contains an inlet port 12 connected to a source of brake applying pressure, such as a master cylinder or brake valve, and the other end block 14 contains a delivery port 16 connected to one or more wheel brake actuators and an exhaust port 18 connected to a brake fluid reservoir. The centre block 20 houses inlet and exhaust valve assemblies each actuated by independent solenoids.

Annular solenoid coils, 22 and 24 respectively associated with the inlet and exhaust valve assemblies are each connected by leads 26 and 28 to an electronic control unit (not shown) including a computer or the like for generating independent actuating signals both of which are a predetermined function (dictated by the computer programme) of parameters representing the conditions at one or more of the road wheels. Typically the parameters are the speed and the rate of change of speed of the road wheels and may be measured or derived in any convenient manner, for example, by means of electro-mechanical or electro-magnetic transducers.

Within the annular inlet valve solenoid coil 22 is a core 30 having a bore 32 in which is slidable an inlet valve spool 34 with a flanged end 36 acting as an armature disposed within an enlarged bore 38 in the core, coaxial with the bore 32. In a recess 35 in the inlet valve solenoid core 30 is a valve seat member 40, the spool 34 being biased away from the valve seat member 40 (i.e. into the open position) by a light compression spring 42, in which position there is a narrow axial gap 44 typically of the order 0.009", between the armature 36 and the core 30, the radial clearance 46 between the armature 36 and the core being as small as possible and typically 0.002". In the open position fluid may flow through the annular gap 41 between the valve seat member 40 and spool 34.

The exhaust valve assembly has a similar construction and includes a solenoid core 50 fitted around and sealed relative to the inlet solenoid core 30, a bore 52, exhaust valve spool 54, armature 56, enlarged bore 58 in the core, recess 55 in the end block 14, valve seat member 60, light compression spring 62, axial gap 64 and radial clearance 66. Spring 62 acts on spool 54 pushing it to the left as shown in FIG. 1 so that the annular gap 61 between the valve seat member 60 and the spool 54 is closed.

Both of the valve seat members 40 and 60 are cup-shaped the bottom face of each of which is formed with a groove 43 and 63 respectively to ensure free passage of fluid respectively through drilling 82 and orifice 90. Also a radius 45 and 65 on the bottom face of the valve seats enables self alignment of the seats and associated spools during closing of the valves.

Each core 30,50 has in an axially central position relative to the associated coil 22,24 a groove 47,67 defining a narrow waisted portion, the radial thickness of the core at that point being sufficient to increase the reluctance of the magnetic circuit to such an extent that a preferential flux path lies through the associated valve armature 36,56.

During braking, the control unit generates a signal on one or both of the leads 26 and 28 in accordance with the programme so that the valve has three distinct operating modes.

| Mode | Inlet Valve Solenoid | Exhaust Valve Solenoid |
| --- | --- | --- |
| Pressure Increase a. | no signal: valve open | no signal: valve closed |
| Pressure Hold b. | signal: valve closed | no signal: valve closed |
| Pressure Decrease c. | signal: valve closed | signal: valve open |

Mode a is the normal non-anti-lock state in which fluid may flow through the valve from port 12 to port 16 in order to apply the brakes. The fluid path is from port 12 through orifice 80, through the centre drilling 39 of spool 34, through open valve gap 41 into chamber 35, through groove 43 into drillings 82, 84, 86, and hence to port 16. The size of orifice 80 may be chosen to control the rate of fluid flow through the valve and thus the rate of pressure increase at the wheel brake. In mode a the armature 36 abuts against the screw 94 which can be adjusted to preset the open armature gap 44. Similarly in mode a the open armature gap 64 of the exhaust valve armature 56 is preset by screwed member 96.

In mode b a signal is applied to lead 26, the resultant flux in core 30 passes across gap 44 into the armature 36, and pulls the armature towards core 30. The armature 36 moves to the left as shown in FIG. 1 until the valve gap 41 closes to shut off fluid flow. Pressure at the wheel brake then remains constant. The closed armature gap 44 may be adjusted by threaded member 92.

During mode b the vehicle driver may wish to reduce brake pressure. This is achieved via the non-return valve 88. When the pressure at inlet port 12 is reduced by driver action, fluid will flow out of the wheel brake into port 16, through drillings 86 and 84, and valve 88, drillings 33 in the inlet valve armature 36, orifice 80 and port 12 back to the brake applying means.

In mode c a signal is also applied to lead 28. The resultant flux in the core 50 and the left hand region of core 30 passes across gap 64 into armature 56, and pulls it towards core 30. The armature 56 moves to the right as shown in FIG. 1 until it abuts against the closed gap setting screw 98. This opens valve gap 61 to allow fluid to flow out of the wheel brake to the reservoir, thus reducing brake pressure. The fluid flow path is from port 16, through drillings 86 and 84, through centre drilling 59 of spool 54, through the opened valve gap 61, into chamber 55, through groove 63, and orifice 90 into exhaust port 18. The size of the orifice 90 may be chosen to control the rate of fluid flow through the exhaust valve and thus the rate of pressure decrease at the wheel brake.

The end of both the inlet 34 and exhaust 54 valve spools and their associated seats 40 and 60 are accurately machined to be the same size to within extremely close tolerance limits so that each of the valves is independently pressure balanced, that is to say no resultant force due to fluid pressure tending to oppose operation of the valve, acts on the spool. It will be appreciated that, by virtue of this feature, the force generated by the solenoid and needed to operate the valve is much less than in conventional solenoid valves, enabling much smaller solenoids to be used, with consequent savings in power and heat losses.

Figure 2:
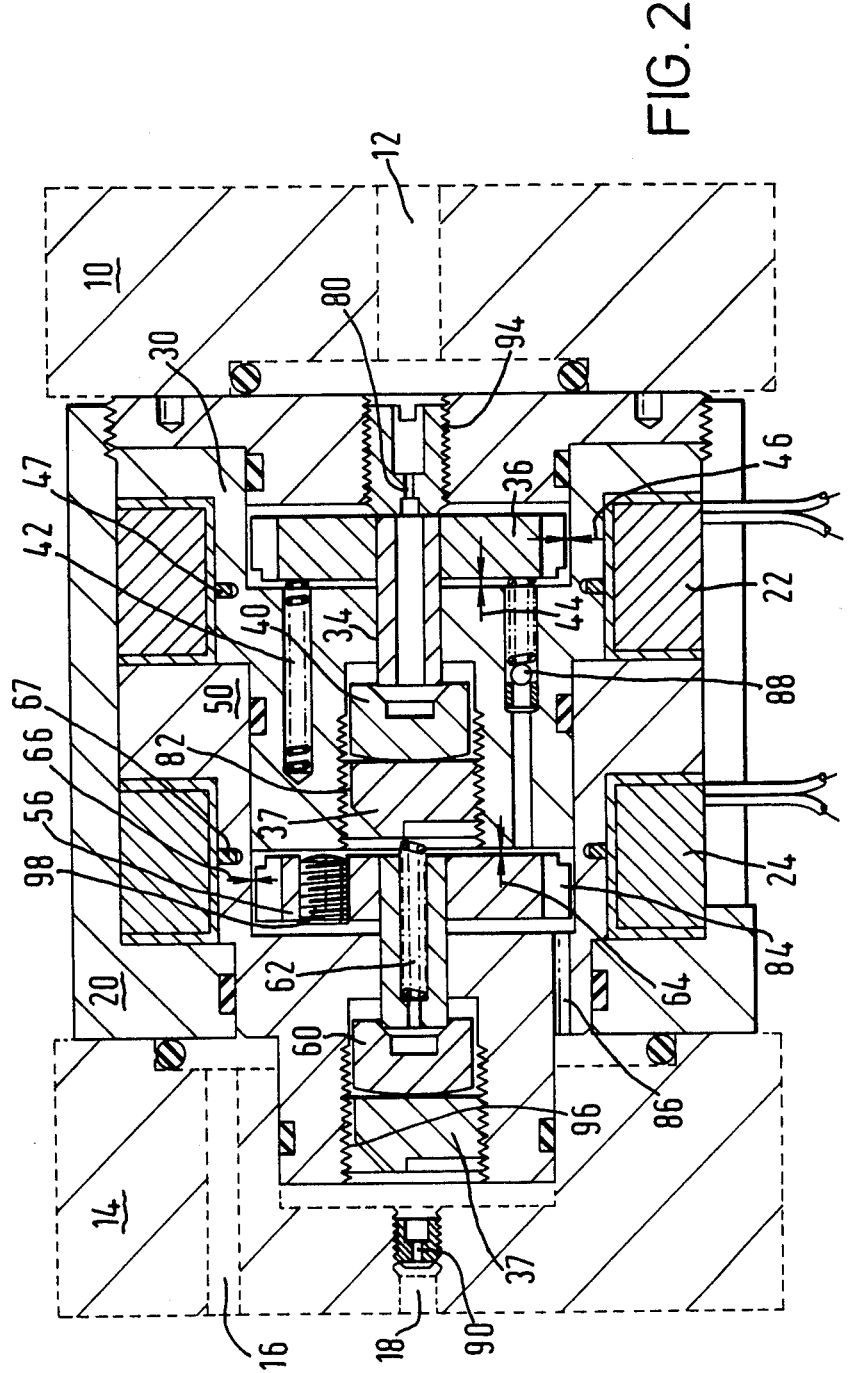
Figure 3:
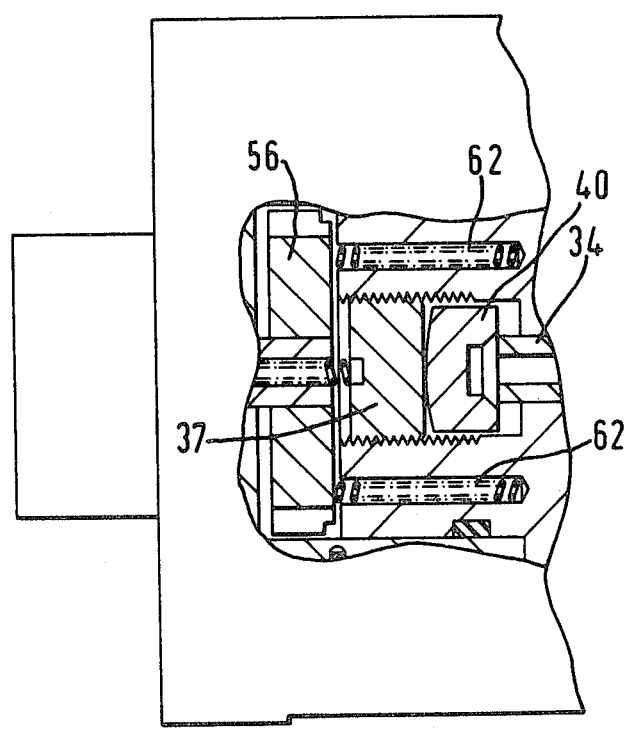

With reference now to FIGS. 2 and 3 in which equivalent components are designated by the same reference numerals as in FIG. 1, the inlet valve spool 34 is a press-fit in a disc 36 equivalent to the armature 36 in the embodiment of FIG. 1. In this embodiment, the two components are of different materials. Also the disc 36, and hence also the spool is biased by two compression springs 42 (one shown) seated in drillings in the solenoid core 30. In the outlet valve, two additional compression springs 62 are provided for biasing the spool, these also being seated in drillings in the inlet valve core 30 and bearing against the disc 56.

In the grooves 47, 67 defining the narrow waisted portion in the solenoid core 30,50 split rings of non-magnetic material are fitted to prevent collapse or fracture of the narrow section at this point.

As in the embodiment of FIG. 1, both valve seat members 40 and 60 are cup-shaped but these abut screwed adjusters 37.

Fluid flow past screwed adjusters 37 is via slots 82 and 96 respectively. The exhaust valve armature closed gap setting screw 98 is fitted in the armature 56 instead of in the core 30.

In mode a the route to the delivery port 16 is via slots 82,84 and drilling 86, and in mode c fluid flows back through drilling 86 and slot 84 and then through a drilling in the spool 54, the open exhaust valve, along slot 96 into drilling 18 via orifice 90.

The stud contact stop 98, is adjustable by virtue of its screwed mounting in the disc 56, from which it stands proud to engage the core 30.

We claim:

1. An hydraulic control valve comprising a solenoid operated valve having a solenoid core defining a chamber for fluid under pressure, and a valve member movable by the armature of the solenoid which is slidable within the core, and a narrow groove formed around the core and locally reducing the radial thickness of the pressure chamber wall so as to establish a preferential flux path through the armature.

2. A control valve according to claim 1 wherein the solenoid core is formed in one piece and wherein said narrow groove is formed in an axially mid position relative to a solenoid coil around the core.

3. A control valve according to claim 1 wherein the solenoid operated valve is pressure balanced.

4. A control valve according to any one of claims 1 to 3 wherein the solenoid operated valve is a special valve, the valve spool being integral with the solenoid armature.

5. A control valve according to claim 4 wherein the valve spool has a flanged end forming the armature and disposed within an enlarged bore in the core, communicating with an inlet for fluid under pressure, wherein the other end of the spool co-operates with a cup-like valve seat element, the interior of which communicates with the said enlarged bore via a bore through the spool.

6. A control valve according to claim 5 wherein the valve seat is movable to enable alignment of the seat during closing of the valve.

7. A control valve according to any one of claims 1 to 3 for use as an automotive brake pressure modulation valve and comprising two solenoid operated valves: an inlet valve and an exhaust valve, wherein each of the said valves is independently pressure balanced and operable by independent solenoid means.

8. An hydraulic anti-lock braking system comprising a control valve according to claim 7, for controlling the supply of fluid under pressure from a brake valve to the brake actuator at the wheel of a vehicle, the coil of the solenoid being connected to a control unit operable to generate actuating signals in response to data signals produced by sensing means and representative of conditions at the vehicle wheel.

* * * * *